W. C. TROMPETER.
AGRICULTURAL IMPLEMENT.
APPLICATION FILED OCT. 6, 1913.
1,114,940.
Patented Oct. 27, 1914.
2 SHEETS—SHEET 1.
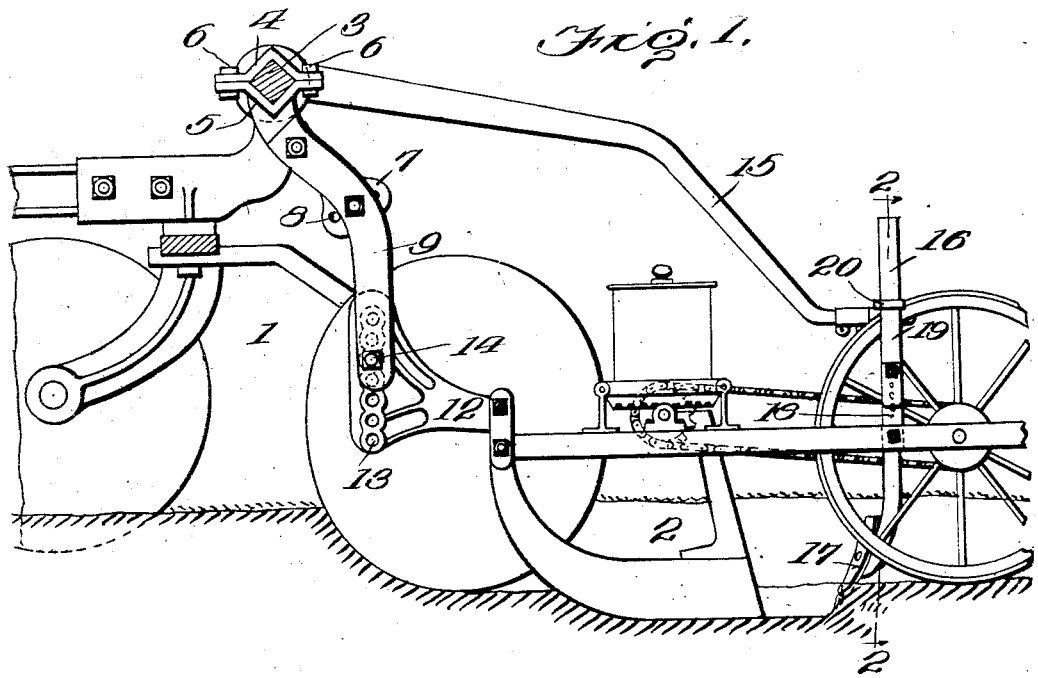
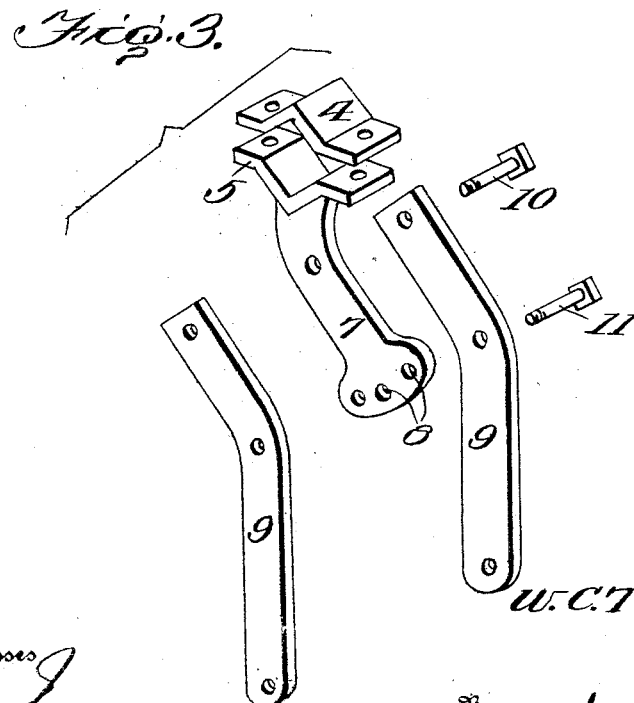
Inventor
W. C. Trompeter.
Witnesses
By
Attorneys W. C. TROMPETER.
AGRICULTURAL IMPLEMENT.
APPLICATION FILED OCT. 6, 1913.
1,114,940.
Patented Oct. 27, 1914.
2 SHEETS—SHEET 2.
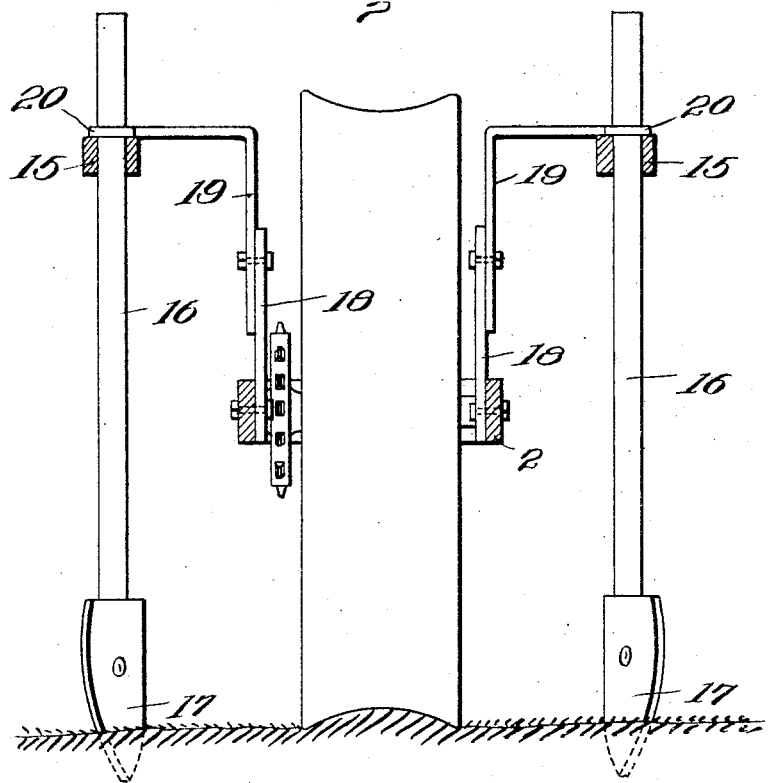
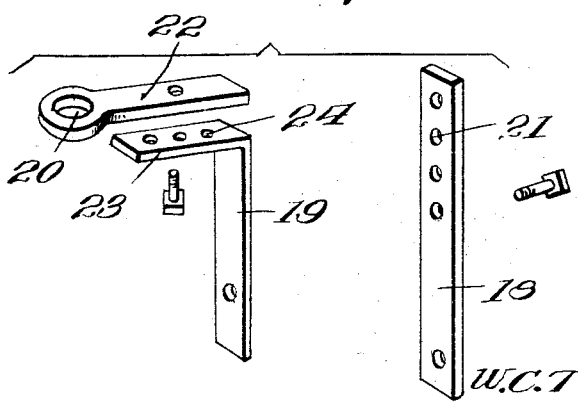

UNITED STATES PATENT OFFICE.

WILLIAM C. TROMPETER, OF EDGEMONT, SOUTH DAKOTA.

AGRICULTURAL IMPLEMENT.

1,114,940.  Specification of Letters Patent.  Patented Oct. 27, 1914.

Application filed October 6, 1913. Serial No. 793,670.

*To all whom it may concern:*

Be it known that I, WILLIAM C. TROMPETER, citizen of the United States, residing at Edgemont, in the county of Fall River and State of South Dakota, have invented certain new and useful Improvements in Agricultural Implements, of which the following is a specification.

This invention relates to agricultural implements, and has for its object the provision of means whereby listed corn may be planted and the ground cultivated at the same time where the lister furrows have been previously plowed, the object of the plowing being to give the soil time to warm up so that the seed will germinate readily and the object of the cultivation being to destroy all weeds that may have started at the time of planting.

The invention also seeks to provide simple and efficient means whereby a grain drill or planter may be coupled to a cultivator so as to be drawn over the field in rear of the cultivator, and a further object of the invention is to provide means whereby the drill may have vertical movement independently of the cultivator and will be prevented from moving laterally with respect to the cultivator.

Other objects of the invention will appear as the description of the same proceeds, and the invention consists in certain novel features of construction and arrangement which will be hereinafter first fully set forth and then more particularly defined in the claims.

The invention is fully illustrated in the accompanying drawings, in which:—

Figure 1 is a sectional elevation of a portion of a cultivator and a planter having my improved coupling applied thereto; Fig. 2 is an enlarged vertical section taken on the line 2—2 of Fig. 1; Fig. 3 is a detail perspective view of the members for applying draft to the planter from the cultivator frame; Fig. 4 is a detail perspective view of the members for effecting vertical movement of the planter and preventing lateral movement thereof.

The cultivator is of the rolling disk type and so much of the same as is necessary to disclose the invention is illustrated generally at 1 in Fig. 1. The planter 2 is also of any convenient or preferred type and as illustrated in Fig. 1 is intended to travel in the furrow in rear of the cultivator and in line therewith.

In carrying out my invention, I secure to the cross bar 3 of the cultivator frame a clamp consisting of upper and lower members 4 and 5 which are intended to encircle the cross bar 3, as clearly shown in Fig. 1, and are securely fastened together by bolts 6 inserted through their projecting ends. From the lower clamp member 5 depends a hanger 7 which extends somewhat rearwardly from the cross bar and is provided with an arcuate series of openings 8 at its lower extremity, as shown. To the opposite sides of the said hanger 7, I secure bars or links 9 which have their upper ends secured to the hanger 7 above the lower end thereof by means of a suitable bolt 10 inserted through the upper ends of the links and an intermediate portion of the hanger, as will be readily understood. A second bolt 11 is inserted through the links intermediate the length thereof and through one of the openings 8 at the lower end of the hanger, so that the links may be adjusted to any desired angle as may be best suited to accomplish the desired results with the type of planter and cultivator which are employed.

To the front end of the planter frame, I secure a bracket or clevis 12 having its front end provided with a vertical series of perforations 13 through one of which and the lower ends of the links 9 a connecting bolt 14 is inserted, as will be readily understood. By this arrangement, the depth to which the shoe of the planter may enter the ground may be accurately adjusted.

In the mechanism illustrated, the cultivator is provided with rearwardly extending beams 15 in the rear ends of which are mounted standards 16 carrying shovels 17.

To prevent lateral movement of the planter relative to the cultivator, I secure to the sides of the planter frame, bars or standards 18 which rise from the frame and have secured to their upper ends angular arms or brackets 19 which extend outwardly and are provided at their extremities with eyes 20 adapted to fit over the upper ends of the said standards 16, the said eyes resting upon the beams 15, as shown clearly in Figs. 1 and 2. The standards 18 are preferably provided with a series of openings 21 through any one of which the securing bolt may be passed so that the arm or bracket 19 may be set at any desired height. The said arm or bracket may be one integral member, as shown in Fig. 2, but will preferably be constructed as shown in Fig. 4 in which the eye 20 is formed upon a separate member 22 which is secured upon an outstanding lip or branch 23 of the arm 19. The said branch 23 is provided with a series of openings 24 through any one of which and the plate 22 the securing bolt may be inserted and the device thereby adjusted to the width of the cultivator or the space between the beams 15.

It is thought the operation of the device will be readily understood. The apparatus is drawn over the field in the usual manner so that the cultivator and the planter will travel in the furrows previously formed by a plow of the lister type with a subsoil attachment. The planter will be positively maintained in alinement with the cultivator so that the seed will be deposited in the soil loosened by the subsoiler in the bottom of the furrow and covered by the presser wheel of the planter. Should the planter strike a large clod or other obstruction, it may ride readily over the same, inasmuch as the eyes 20 rest easily and freely upon the standards, but will be prevented from dropping by their contact with the upper surfaces of the beams 15. When the apparatus has reached the end of a furrow, or for any other reason it is desired to raise the mechanism from the ground, the usual lever connected to the cultivator is operated and the cultivator and the planter will thereupon be lifted. The arrangement of the parts will be such that there will be a slight lost motion between the members secured to the planter and the parts of the cultivator engaged by the same, so that the cultivator will be raised slightly in advance of the planter and the initial strain upon the lifting lever thus reduced sufficiently to permit easy manipulation of the same and avoid bending or breaking thereof.

The device is exceedingly simple and may be readily applied to any cultivator and planter and may be easily adjusted to plant at any desired depth.

What I claim is:—

1. The combination with a planter, and a cultivator, of a hanger rigidly secured to and depending from the cultivator, links secured to and depending from said hanger and angularly adjustable thereon and a draft device secured to the front end of the planter and to the lower ends of the said links.

2. The combination with a planter, and a cultivator, of a hanger rigidly secured to and depending from the cultivator, a link secured to and depending from the hanger, and a draft device secured to the front end of the planter and adjustably secured to the lower end of said link.

3. The combination with a planter, and a cultivator, of a connection between the front end of the planter and the cultivator, and a standard secured to the planter frame and carrying an eye at its upper end adapted to rest upon the cultivator frame and vertically slidable thereon.

4. The combination with a planter, a cultivator frame having a rearwardly extending beam, and a standard mounted in the rear end of said beam, of a standard secured to the planter frame and carrying at its upper end an eye loosely fitting over said standard in the cultivator frame and adapted to rest upon said frame.

5. The combination with a planter, a cultivator frame having rearwardly extending beams, and standards fitted vertically in the rear ends of said beams, of members secured rigidly to and rising from the planter frame, and angularly disposed members adjustably secured to said rigidly secured members and provided at their upper outer extremities with eyes adapted to rest upon the cultivator beams and slidably engage the standards fitted in said beams.

In testimony whereof I affix my signature in presence of two witnesses.

WILLIAM C. TROMPETER. [L. s.]

Witnesses:
W. A. GUILFOYLE,
L. R. PARKINS.